United States Patent
Jonsson et al.

(10) Patent No.: US 12,314,110 B1
(45) Date of Patent: May 27, 2025

(54) ENERGY EFFICIENT ETHERNET (EEE) OPERATION

(71) Applicant: Marvell Asia Pte Ltd, Singapore (SG)

(72) Inventors: Ragnar Hlynur Jonsson, Aliso Viejo, CA (US); Seid Alireza Razavi Majomard, Belmont, CA (US); Brian Edem, Saratoga, CA (US); David Shen, Saratoga, CA (US); George Allan Zimmerman, Manhattan Beach, CA (US)

(73) Assignee: Marvell Asia Pte Ltd, Singapore (SG)

( * ) Notice: Subject to any disclaimer, the term of this patent is extended or adjusted under 35 U.S.C. 154(b) by 69 days.

(21) Appl. No.: 18/142,491

(22) Filed: May 2, 2023

Related U.S. Application Data

(60) Provisional application No. 63/337,235, filed on May 2, 2022, provisional application No. 63/337,240, filed on May 2, 2022.

(51) Int. Cl.
| | | |
|---|---|---|
| *G06F 1/26* | (2006.01) | |
| *G06F 1/3206* | (2019.01) | |
| *G06F 1/3203* | (2019.01) | |

(52) U.S. Cl.
CPC .......... *G06F 1/3206* (2013.01); *G06F 1/3203* (2013.01)

(58) Field of Classification Search
CPC .................................................... G06F 1/3206
USPC ........................................................ 713/320
See application file for complete search history.

(56) References Cited

U.S. PATENT DOCUMENTS

| | | | | |
|---|---|---|---|---|
| 8,169,893 | B1* | 5/2012 | Getker | H04L 45/22 709/228 |
| 9,207,740 | B2* | 12/2015 | Manav | G06F 1/3209 |
| 2009/0204836 | A1* | 8/2009 | Diab | H04L 12/12 713/323 |
| 2010/0262844 | A1* | 10/2010 | Diab | G06F 1/3209 713/300 |
| 2011/0246798 | A1* | 10/2011 | Bilgin | G06F 1/3203 709/202 |
| 2014/0010130 | A1* | 1/2014 | Diab | H04L 12/12 370/296 |
| 2014/0112663 | A1 | 4/2014 | Diab | |
| 2017/0038970 | A1* | 2/2017 | Ishiguro | G06F 1/3209 |
| 2017/0118708 | A1* | 4/2017 | Alon | H04W 52/0212 |
| 2019/0129630 | A1* | 5/2019 | Erez | G06F 3/0688 |
| 2019/0129636 | A1* | 5/2019 | Benisty | G06F 3/0634 |

(Continued)

FOREIGN PATENT DOCUMENTS

EP 3860045 A1 * 8/2021 ........... G06F 1/3209

OTHER PUBLICATIONS

IEEE Specification Oct. 27, 2021.*

(Continued)

*Primary Examiner* — Volvick Derose

(57) ABSTRACT

A network interface device operates in a normal operating mode in which the network interface device continually receives transmission symbols via a communication link. The network interface device determines that the network interface device is to transition to a low power mode, and in response transitions receiver circuitry to the low power mode. During a transition time period corresponding to determining that that the network interface device is to (Continued)

transition to the low power mode, the network interface device ignores signals received via the communication link.

20 Claims, 9 Drawing Sheets

(56) References Cited

U.S. PATENT DOCUMENTS

| | | | | |
|---|---|---|---|---|
| 2019/0364500 A1* | 11/2019 | Sambhwani | ...... | H04W 52/0216 |
| 2021/0328819 A1 | 10/2021 | Benyamin et al. | | |
| 2022/0077879 A1* | 3/2022 | Husain | ........... | H04B 1/0003 |
| 2022/0216978 A1* | 7/2022 | Fitzgerald | ........... | H04L 12/12 |

OTHER PUBLICATIONS

Axer et al., "802.3bp Sleep/Wake-up Specification—TC10—OPEN Sleep/Wake-up Specification for Automotive Gigabit Ethernet," OPEN Alliance, Jul. 28, 2021 (23 pages).

"IEEE Std 802.3ch™-2020, Amendment 8: Physical Layer Specifications and Management Parameters for 2.5 GB/s, 6 GB/s, and 10 GB/s Automotive Electrical Ethernet," The Institute for Electrical and Electronics Engineers (IEEE), Jun. 4, 2020 (207 pages).

Jonsson et al., "Clarify EEE Quiet Signaling—Contribution to IEEE 802.3cy," available at https://www.ieee802.org/3/cy/public/adhoc/jonsson_majomard_3cy_01_05_03_22.pdf, May 3, 2022 (6 pages).

Jonsson et al., "Design Considerations for EEE—Contribution to IEEE 802.3cy," available at https://www.ieee802.org/3/cy/public/adhoc/jonsson_majomard_3cy_01_04_05_22.pdf, Apr. 5, 2022 (10 pages).

Jonsson et al., "Text Proposal for EEE Quiet Signalling—Contribution to IEEE 802.3cy," available at https://www.ieee802.org/3/cy/public/May 22/jonsson_zimmerman_majomard_3cy_01a_05_17_22.pdf, (7 pages).

Zimmerman, "EEE Scenarios for Automotive Links," available at https://www.ieee802.org/3/cy/public/adhoc/zimmerman_3cy_01_12_07_21.pdf, Dec. 2, 2021 (11 pages).

Zimmerman, "Energy Efficient Ethernet, Wake Signals and Deep Sleep for Automotive Ethernet," available at https://www.ieee802.org/3/ch/public/jul17/zimmerman_3ch_02a_0717.pdf, Jul. 2017 (16 pages).

Non-Final Office Action for U.S. Appl. No. 18/201,135, mailed Sep. 28, 2024 (9 pages).

* cited by examiner

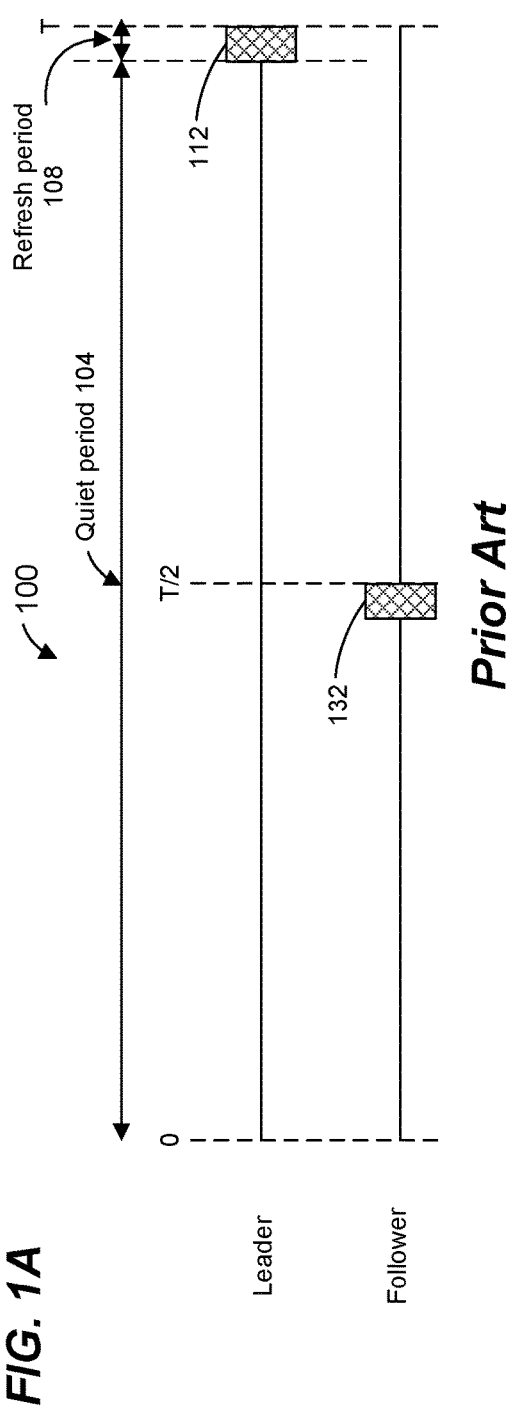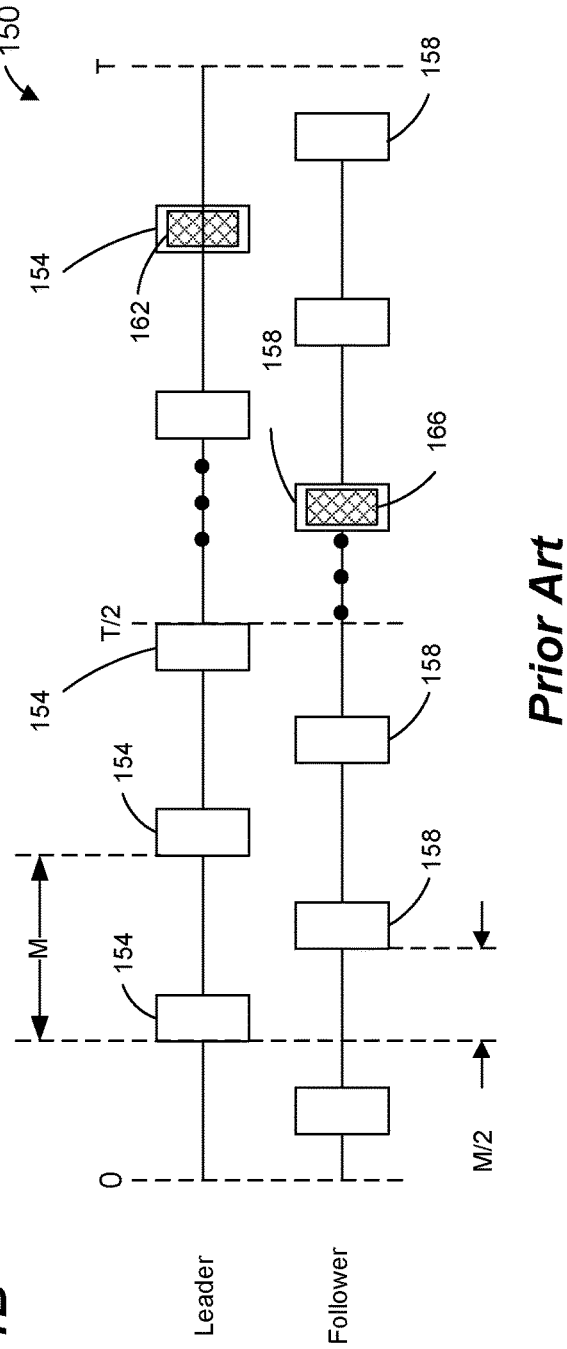

*Prior Art*

ENERGY EFFICIENT ETHERNET (EEE) OPERATION

CROSS REFERENCES TO RELATED APPLICATIONS

This application claims the benefit of U.S. Provisional Patent App. No. 63/337,235, entitled "Revisit Alert Signaling," filed on May 2, 2022, and U.S. Provisional Patent App. No. 63/337,240, entitled "Energy Efficient Ethernet (EEE) Quiet Signaling Clarification," filed on May 2, 2022. Both of the applications referenced above are hereby expressly incorporated herein by reference in their entireties.

FIELD OF TECHNOLOGY

The present disclosure relates generally to communication technology, and more particularly to power saving techniques for communications.

BACKGROUND

The IEEE 802.3ch™ Standard, *Institute for Electrical and Electrical Engineers (IEEE)*, pp. 1-207, Jun. 30, 2020 ("IEEE Std 802.3ch™-2020"), describes a feature, referred to as Energy Efficient Ethernet (EEE), that reduces power consumption during periods in which a transmitter does not need to transmit data. For example, when the transmitter does not need to transmit data via a communication link, the transmitter transitions the communication link from a normal operation mode to a low power idle (LPI) mode of operation. During the LPI mode, the transmitter and the receiver operate in a repeating quiet-refresh cycle in which the transmitter transmits nothing during periodic time periods (referred to as "quiet time periods"), and transmits refresh symbols during other periodic time periods (referred to as "refresh time periods"). Because nothing is transmitted during the quiet time periods, power consumption is reduced at the transmitter. Similarly, the receiver may also go to sleep during the quiet time periods to reduce power consumption. Transmission of the refresh symbols during the refresh time periods permits the receiver to maintain clock synchronization and to adapt filters (e.g., equalization filters) of the receiver.

FIG. 1A is a diagram of signals transmitted/received by a leader communication device and a follower communication device during the LPI mode as defined by IEEE Std 802.3ch™-2020. More specifically, FIG. 1A is diagram of an example quiet/refresh cycle 100 of the EEE.

The LPI includes multiple repeating quiet/refresh cycles such as illustrated in FIG. 1A. The quiet/refresh cycle 100 has a duration T and includes a quiet period 104 and a refresh period 108. In an embodiment, the quiet time period 104 is significantly longer than the refresh period. For example, a length of the quiet time period 104 is typically more than 90 times a length of the refresh period.

During the quiet period 104, the master PHY processing device does not transmit (according to an embodiment), whereas during the refresh period, the leader communication device transmits a refresh signal 112 comprising refresh symbols. The follower communication device receives the refresh signal 112 and uses the refresh symbols to synchronize to the timing of the leader communication device and adjust adaptive filters of the follower communication device.

The follower communication device similarly operates in a quiet period/refresh period that is offset from the quiet period 104/refresh period 108 by T/2. For example, the follower communication device does not transmit (according to an embodiment) during the corresponding quiet period, whereas during the refresh period, the follower communication device transmits a refresh signal 132 comprising refresh symbols. The leader communication device receives the refresh signal 132 and uses the refresh symbols to adjust adaptive filters of the leader communication device. Optionally, the leader communication device also uses the refresh symbols from the follower communication device to adjust timing of the leader communication device to improve a signal to noise ratio (SNR) at the leader communication device.

The quiet/refresh cycle 100 includes designated windows (referred to herein as "alert windows") in which the leader communication device and the follower communication may transmit a signal (referred to herein as an "alert signal") that warns a link partner that a wake signal will be transmitted, where the wake signal is a request to exit the LPI mode. FIG. 1B is a diagram of an example quiet/refresh cycle 150 illustrating first alert windows 154 for the leader communication device and second alert windows 158 for the follower communication device.

When in the LPI mode, the leader communication device is configured to power up (at least some receiver circuitry) to be prepared to receive an alert signal in any of the first alert windows 154. The leader communication device is configured to, in response to receiving an alert signal is a first alert window 154, keep the at least some receiver circuitry powered up in anticipation of receiving a wake signal. In response to receiving the wake signal, the leader communication device exits the LPI mode. When in the LPI mode, the leader communication device is configured to power down (at least some receiver circuitry) when outside of the first alert windows 154. In FIG. 1B, the leader communication device receives an alert signal 162 in one of the first alert windows 154, as an illustrative example.

When in the LPI mode, the follower communication device is configured to power up (at least some receiver circuitry) to be prepared to receive an alert signal in any of the second alert windows 158. The follower communication device is configured to, in response to receiving an alert signal in a second alert window 158, keep the at least some receiver circuitry powered up in anticipation of receiving a wake signal. In response to receiving the wake signal, the follower communication device exits the LPI mode. When in the LPI mode, the follower communication device is configured to power down (at least some receiver circuitry) when outside of the second alert windows 158. In FIG. 1B, the follower communication device receives an alert signal 166 in one of the second alert windows 158, as an illustrative example.

FIG. 1C illustrates a transmission of an alert signal 178, which is transmitted within an alert window 154, 158. A wake signal 182 is transmitted immediately following the alert signal 178.

Each of the alert windows 154 occur at a period of M, and the second alert windows 158 also occur at the period M. The first alert windows 154 and the second alert windows 158 are staggered from one another so that an alert signal transmitted by the leader communication device will not overlap in time with transmission of an alert signal by the follower communication device. A start of each first alert window 154 occurs at a time M/2 before a start of each corresponding second alert window 158.

FIGS. 1A-B illustrate a scenario in which both directions of a communication link are operating according to the LPI mode. In some scenarios, only one direction of the communication link operates according to the LPI mode. For example, when the leader communication device does not have data to transmit to the follower communication device but the follower communication device has data to transmit to the leader communication device, transmit-side circuitry of the leader communication device may transition to the LPI mode (e.g., the leader communication device does not transmit during the quiet refresh period 104 and transmits the refresh signal 112 during the refresh period 108), whereas receive-side circuitry of the leader communication device remains in a normal operating mode to receive data from the follower communication device. Similarly, when the transmit-side circuitry of the leader communication device transitions to the LPI mode, receive-side circuitry of the follower communication device transitions to the LPI mode (e.g., receive-side circuitry of the follower communication device goes to sleep except during alert windows 154 and/or during the refresh period), whereas transmit-side circuitry of the follower communication device remains in a normal operating mode to transmit data to the leader communication device. As another example, when the follower communication device does not have data to transmit to the leader communication device but the leader communication device has data to transmit to the follower communication device, transmit-side circuitry of the follower communication device may transition to the LPI mode (e.g., the follower communication device does not transmit during the quiet period and transmits the refresh signal 132 during the refresh period), whereas receive-side circuitry of the follower communication device remains in a normal operating mode to receive data from the leader communication device. Similarly, when the transmit-side circuitry of the follower communication device transitions to the LPI mode, receive-side circuitry of the leader communication device transitions to the LPI mode (e.g., receive-side circuitry of the leader communication device goes to sleep except during the alert windows 154 and/or during the refresh period), whereas transmit-side circuitry of the leader communication device remains in a normal operating mode to transmit data to the follower communication device.

As discussed above, and as can be seen in FIG. 1A, there are significant time periods while transmit-side circuitry of a communication device is in the LPI mode (e.g., quiet periods) in which at least some transmit-side circuitry of the communication device can be shut down (or put to sleep, or otherwise put into a low power mode of operation) because nothing is being transmitted during the quiet periods. Similarly, as discussed above and as can be seen in FIG. 1B, there are significant time periods while receive-side circuitry of a communication device is in the LPI mode in which at least some receive-side circuitry of the communication device can be shutdown (or put to sleep or otherwise put into a low power mode of operation) because the link partner will not transmit outside of the alert windows 154, 158 and the refresh period 108.

FIG. 2 is a state diagram 200 that illustrates transmit-side operation of the EEE procedure defined by IEEE Std 802.3ch™-2020. In a state 204, transmitter circuitry of the communication device operates in a normal operating mode in which the transmitter circuitry continually transmits transmission symbols via a communication link, e.g., transmits data symbols when there is data to transmit and transmits idle symbols when there is no data to transmit. While in the state 204, several state variables are set. For example, a tx_lpi_active variable is set to FALSE to indicate that the communication device is not in the LPI mode; a tx_lpi_qr_active variable is set to FALSE to indicate that the communication device is not in the quiet/refresh cycle of the LPI mode; and a tx_lpi_alert_active variable is set to FALSE to indicate that the transmitter circuitry is not transmitting the alert signal.

When the communication device determines that the transmitter circuitry is to go into the LPI mode, the communication device sets a tx_lpi_req variable to TRUE. In response to tx_lpi_req being TRUE, the communication device transitions to a state 208 upon a next Reed-Solomon forward error correction (RS-FEC) superframe boundary, where an RS-FEC superframe comprises eight RS-FEC frames, and where each RS-FEC frame corresponds to a time required to transmit an RS-FEC codeword via the communication link.

In IEEE Std 802.3ch™-2020, transmissions are partitioned into physical layer (PHY) frames, and link partners synchronize transmission and reception to the PHY frame boundaries. An RS-FEC frame is aligned with the PHY frames and includes four PHY frames.

In the state 208, the communication device transmits a sleep signal to the link partner to signal to the link partner that the transmitter circuitry is going into the quiet/refresh cycle 100, 150, and continues transmitting the sleep signal until an lpi_tx_sleep_timer expires.

When transmission of the sleep signal is completed and if the tx_lpi_req variable is still TRUE, the communication device transitions to a state 212 that corresponds to the quiet/refresh cycle 100, 150. In state 212, the state variable tx_lpi_qr_active variable is set to TRUE to indicate that the communication device is in the quiet/refresh cycle, and the transmit circuitry acts in a manner described above with reference to FIGS. 1A-B.

When the communication device determines that the transmitter circuitry is to exit the LPI mode, the communication device sets the tx_lpi_req variable to FALSE. In response to tx_lpi_req being FALSE and during an alert window 154, 158, the communication device transitions from the state 212 to a state 216 at the end of a RS-FEC codeword frame boundary.

In the state 216, which corresponds to transmission of the alert signal, the communication device sets the tx_lpi_qr_active variable to FALSE to indicate that the communication device is no longer in the quiet/refresh cycle of the LPI mode, and sets the tx_lpi_alert_active variable to TRUE to indicate that the transmitter circuitry is transmitting the alert signal. Additionally, the communication device transmits the alert signal to the link partner to signal to the link partner that the transmitter circuitry will transmit a wake signal, and continues transmitting the alert signal until an lpi_tx_alert_timer expires.

When transmission of the alert signal is completed, the communication device transitions to a state 220 that corresponds to transmitting the wake signal. In state 220, the state variable tx_lpi_alert_active variable is set to FALSE to indicate that the communication device is not transmitting the alert signal. Additionally, the communication device transmits the wake signal to the link partner to prompt the link partner to exit the LPI mode, and continues transmitting the wake signal until an lpi_tx_wake_timer expires. When transmission of the wake signal is completed, the communication device transitions back to state 204.

Referring again to the state 208, when transmission of the sleep signal is completed and if the tx_lpi_req variable is FALSE, which indicates that the communication device no longer wants the transmitter circuitry to go into the LPI mode, the communication device transitions to the state 216, during which the communication device transmits the alert signal as discussed above.

SUMMARY

In an embodiment, a network interface device comprises: physical layer (PHY) circuitry comprising a transceiver, the PHY processor being configured to perform PHY functions associated with a communication link; and a controller. The controller is configured to: operate the PHY circuitry in a normal operating mode in which the PHY circuitry continually receives transmission symbols via the communication link; determine that the PHY circuitry is to transition to a low power mode in which a link partner does not transmit during a quiet period to conserve power; in response to determining that the PHY circuitry is to transition to the low power mode, transition receiver circuitry of the PHY circuitry to the low power mode; during a first transition time period corresponding to determining that that the network interface device is to transition to the low power mode, control the PHY circuitry to ignore signals received via the communication link; and after the first transition time period, control the PHY circuitry to operate the receiver circuitry in the low power mode.

In another embodiment, a method for maintaining a communication link includes: operating a network interface device in a normal operating mode in which the network interface device continually receives transmission symbols via the communication link; determining, at the network interface device, that the network interface device is to transition to a low power mode in which a link partner does not transmit during a quiet period to conserve power; in response to determining that the network interface device is to transition to the low power mode, transitioning receiver circuitry of the network interface device to the low power mode; during a first transition time period corresponding to determining that that the network interface device is to transition to the low power mode, ignoring, at the network interface device, signals received via the communication link; and after the first transition time period, operating the receiver circuitry in the low power mode.

In yet another embodiment, a network interface device comprises: physical layer (PHY) circuitry comprising a transceiver, the PHY processor being configured to perform PHY functions associated with a communication link; and a controller. The controller is configured to: control the PHY circuitry to operate in a normal operating mode in which the PHY circuitry continually transmits transmission symbols via the communication link; determine that the PHY circuitry is to transition to a low power mode in which the PHY circuitry stops transmissions during a quiet period to conserve power; in response to determining that the PHY circuitry is to transition to the low power mode, control the PHY circuitry to transmit a sleep signal to a link partner to prompt the link partner to transition to the low power mode; while transmitting the sleep signal, determine that the PHY circuitry should be in the normal operating mode; after completing transmission of the sleep signal and after determining that the PHY circuitry should be in the normal operating mode, operating the PHY circuitry in the low power mode; in response to determining, while transmitting the sleep signal, that the PHY circuitry should be in the normal operating mode, initiate transition of the PHY circuitry to the normal operating mode at a next-occurring alert window; and in response to determining, while transmitting the sleep signal, that the PHY circuitry should be in the normal operating mode, complete transitioning of the PHY circuitry to the normal operating mode.

In still another embodiment, a method for maintaining a communication link includes: operating a network interface device in a normal operating mode in which the network interface device continually transmits transmission symbols via the communication link; determining, at the network interface device, that the network interface device is to transition to a low power mode in which the network interface device stops transmissions during a quiet period to conserve power; in response to determining that the network interface device is to transition to the low power mode, transmitting, by the network interface device, a sleep signal to a link partner to prompt the link partner to transition to the low power mode; while transmitting the sleep signal, determining at the network interface device, that the network interface device should be in the normal operating mode; after completing transmission of the sleep signal and after determining that the network interface device should be in the normal operating mode, operating the network interface device in the low power mode; in response to determining, while transmitting the sleep signal, that the network interface device should be in the normal operating mode, initiating transition of the network interface device to the normal operating mode at a next-occurring alert window; and in response to determining, while transmitting the sleep signal, that the network interface device should be in the normal operating mode, completing transitioning of the network device to the normal operating mode.

In another embodiment, a network interface device comprises: physical layer (PHY) circuitry comprising a transceiver, the PHY circuitry being configured to perform PHY functions associated with a communication link; and a controller. The controller is configured to: operate the PHY circuitry in a normal operating mode in which the PHY circuitry continually transmits transmission symbols via the communication link; determine that the PHY circuitry is to transition to a low power mode in which the PHY circuitry stops transmissions during a quiet period to conserve power; in response to determining that the PHY circuitry is to transition to the low power mode, control the PHY circuitry to transmit a sleep signal to a link partner to prompt the link partner to transition to the low power mode; after completing transmission of the sleep signal, control the PHY circuitry to operate in the low power mode; determine that the PHY circuitry is to transition to the normal operating mode; in response to determining that the PHY circuitry is to transition to the normal operating mode, control the PHY circuitry to transmit a wake signal to the link partner via the communication link, including controlling the PHY circuitry to begin transmission of the wake signal during an alert window without transmitting an alert signal prior to the wake signal in the alert window; and after transmitting the wake signal, control the PHY circuitry to operate in the normal operating mode.

In another embodiment, a method for maintaining a communication link includes: operating a network interface device in a normal operating mode in which the network interface device continually transmits transmission symbols via the communication link; determining, at the network interface device, that the network interface device is to transition to a low power mode in which the network interface device stops transmissions during a quiet period to conserve power; in response to determining that the network interface device is to transition to the low power mode, transmitting, by the network interface device, a sleep signal to a link partner to prompt the link partner to transition to the low power mode; after completing transmission of the sleep signal, operating the network interface device in the low power mode; determining, at the network interface device, that the network interface device is to transition to the normal operating mode; in response to determining that the network interface device is to transition to the normal operating mode, transmitting a wake signal to the link partner via the communication link, including beginning transmission of the wake signal during an alert window without transmitting an alert signal prior to the wake signal in the alert window; and after transmitting the wake signal, operating the network interface device in the normal operating mode.

BRIEF DESCRIPTION OF THE DRAWINGS

FIG. 1A is a diagram of signals transmitted/received by a leader communication device and a follower communication device during a low power idle (LPI) mode as defined by IEEE Std 802.3ch™-2020.

FIG. 1B is a diagram of an example quiet/refresh cycle of the LPI mode.

DETAILED DESCRIPTION

According to the Energy Efficient Ethernet (EEE) mechanism defined by the IEEE 802.3ch™ Standard, *Institute for Electrical and Electrical Engineers (IEEE)*, pp. 1-207, Jun. 30, 2020 ("IEEE Std 802.3ch™-2020"), a communication device must provide zeroes to transmit physical medium attachment (PMA) sublayer circuitry to quiet a transmitter when beginning a sleep period in a low power idle (LPI) mode. The transmit PMA sublayer circuitry typically includes a modulator, an amplifier, etc. There often is a delay, however, between when zeroes are provided to the PMA sublayer circuitry and when a transmission signal on the channel medium goes quiet. For example, after the beginning of the sleep period, there often are signal "glitches" and/or transient signals on the channel medium for a period of time before the channel medium goes quiet. Such glitches/transients may cause unpredictable behavior at the link partner, which may be expecting the channel medium to be completely quiet.

In some embodiments described below, receiver circuitry of a communication device ignores signals received via a communication medium for a suitable period of time after a low power mode of operation begins. In some such embodiments, if glitches/transients from a link partner are received by the receiver circuitry, the receiver ignores the signals and thus unpredictable behavior by the communication device is avoided.

Figure 1C:
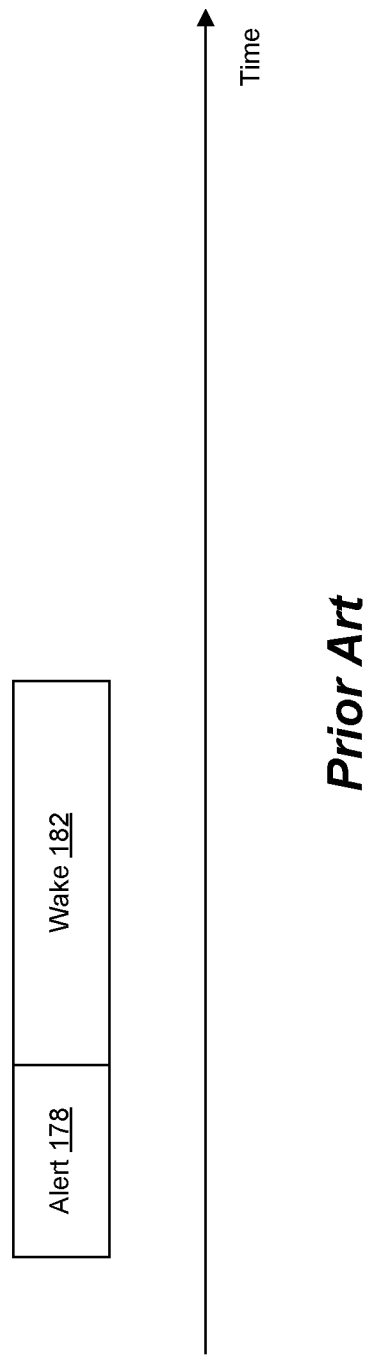
FIG. 1C illustrates a transmission off an alert signal, which is transmitted within an alert window of FIG. 1B.

Additionally, embodiments of techniques for exiting a low power mode of operation are described below that are more streamlined than the state machine discussed above with reference to FIG. 2. For example, when a communication device is to exit the low power mode, the communication device transmits a wake signal without first transmitting an alert signal, according to an embodiment. By skipping transmission of the alert signal described above with reference to FIGS. 1A-B and 2, exiting the low power mode of operation is more streamlined as compared to the technique described above with reference to FIG. 2, which improves device interoperability, at least in some embodiments.

Figure 3:
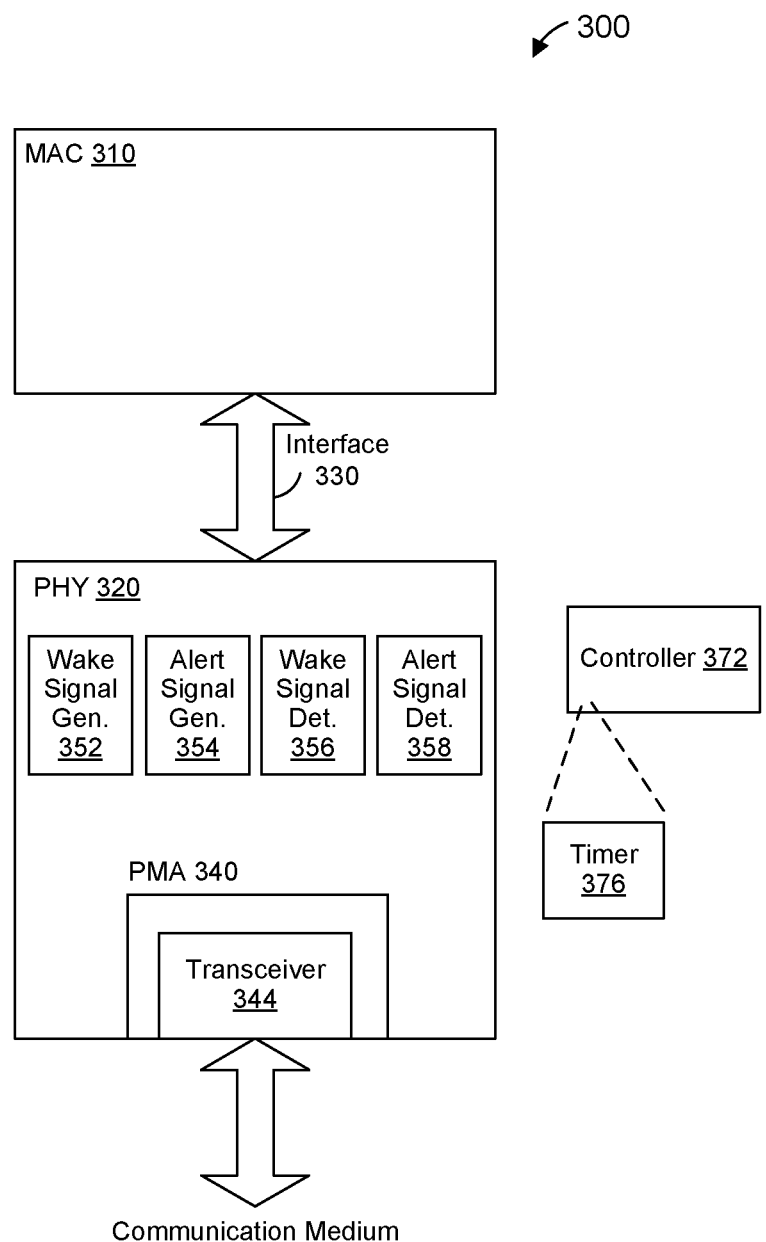
FIG. 3 is a block diagram of an example network interface device that is configured to implement one or more methods of maintaining a communication link, according to an embodiment.

FIG. 3 is a block diagram of an example network interface device 300, according to an embodiment. The network interface device 300 includes at least a media access control (MAC) processing device 310 and physical layer (PHY) circuitry 320. In some embodiments, the MAC processing device 310 and the PHY circuitry 320 are configured to operate according to a communication protocol such as the IEEE 802.3 Ethernet Standard or another suitable communication protocol.

The MAC processing device 310 is configured to perform MAC layer functions associated with the communication protocol such as the communication protocol defined by the IEEE 802.3 Ethernet Standard or another suitable communication protocol. Similarly, the PHY circuitry 320 is configured to perform PHY functions associated with a communication protocol such as the communication protocol defined by the IEEE 802.3 Ethernet Standard (except as otherwise disclosed below) or another suitable communication protocol.

In an embodiment the MAC processing device 310 comprises a processor (not shown) and a memory (not shown) coupled to the processor, where the processor is configured to execute machine readable instructions stored in the memory. In an embodiment, the memory stores machine readable instructions that, when executed by the processor, cause the processor to perform MAC layer functions associated with a communication protocol such as the communication protocol defined by the IEEE 802.3 Ethernet Standard or another suitable communication protocol.

In another embodiment the MAC processing device 310 additionally or alternatively comprises a hardware state machine (not shown) configured to perform MAC layer functions associated with a communication protocol such as the communication protocol defined by the IEEE 802.3 Ethernet Standard or another suitable communication protocol.

The MAC processing device 310 is communicatively coupled to the PHY circuitry 320 via a communication interface 330 such as a 10 Gigabit Media Independent Interface (XGMII). In other embodiments, the MAC processing device 310 is communicatively coupled to the PHY processing device 320 via another suitable communication interface such as another suitable media independent interface (e.g., the reduced media-independent interface (RMII), the Gigabit Media Independent Interface (GMII), the reduced gigabit media-independent interface (RGMII), the serial gigabit media-independent interface (SGMII), the high serial gigabit media-independent interface (HSGMII), the quad serial gigabit media-independent interface (QSGMII), etc.), according to some embodiments.

In an embodiment, the MAC processing device 310 provides data for transmission to the PHY circuitry 320 via the interface 330. In response to receiving the data from the MAC processing device 310, the PHY circuitry 320 encodes, scrambles, and modulates the data to generate a transmission signal for transmitting the data via a suitable communication medium such as a wired, optical, or wireless communication medium.

In an embodiment, the PHY circuitry 320 also receives a receive signal via the communication medium, and demodulates, de-scrambles, and decodes data in the receive signal to generate received data. Additionally, the PHY circuitry 320 provides at least some of the received data to the MAC processing device 310 via the interface 330. In various embodiments, the PHY circuitry 320 includes one or more encoder devices (not shown), a scrambler device (not shown), for encoding, and scrambling data as part of generating a transmission signal, according to an embodiment. The PHY circuitry 320 also includes a de-scrambler device (not shown), and one or more decoder devices (not shown) for de-scrambling, and decoding as part of generating the received data, according to an embodiment.

The PHY circuitry 320 includes PMA layer circuitry 340 that is configured to perform PMA layer functions defined by the communication protocol. The PMA layer circuitry 340 includes a transceiver 344 that is configured to transmit signals and receive signals via the communication medium.

The PMA layer circuitry 340 includes a modulator (not shown) that modulates data as part of generating a transmission signal, according to an embodiment. The PMA layer circuitry 310 also includes a demodulator (not shown) that demodulates information bits from a received signal as part of generating the received data, according to an embodiment.

In some embodiments, the PMA layer circuitry 340 also includes an analog-to-digital converter (hereinafter "ADC", not shown) that converts an analog signal received via the communication medium to a digital signal. In some embodiments, the PMA layer circuitry 340 also includes a digital-to-analog converter (hereinafter "DAC", not shown) that converts a digital signal to an analog signal for transmission via the communication medium.

In some embodiments, the PHY circuitry 320 also includes a digital signal processing circuitry (hereinafter "DSP", not shown) that processes the digital signal to generate a signal corresponding to modulation symbols that are then demodulated by the demodulator (not shown). In some embodiments, at least some functions of the PMA circuitry 340 are performed by the DSP.

In some embodiments, the PHY circuitry 320 is configurable as either a leader device or a follower device. A leader device uses a free running local clock to determine the timing of transmitter operations, according to an embodiment. A follower device recovers the clock from the signal received from the leader device and uses the received signal to determine the timing of transmitter operations, according to an embodiment. Furthermore, the leader device and the follower device are configured to synchronize their clocks and timing of transmitter operations during a training mode before entering a normal data transmission mode.

The PHY circuitry 320 includes a wake signal generator 352 that is configured to generate a wake signal defined by the communication protocol. The wake signal is configured to, when transmitted to a link partner via the communication medium, prompt the link partner to exit a low power mode of operation, as will be described further below. The PHY circuitry 320 also includes an alert signal generator 354 that is configured to generate an alert signal defined by the communication protocol. The alert signal is configured to, when transmitted to a link partner via the communication medium, warn the link partner that a wake signal will be transmitted. In some embodiments, the alert signal generator 354 is omitted.

The PHY circuitry 320 also includes a wake signal detector 356 that is configured to detect a wake signal received from the link partner via the communication medium. The PHY circuitry 320 further includes an alert signal detector 358 that is configured to detect an alert signal received from the link partner via the communication medium. In some embodiments, the alert signal detector 358 is omitted.

The PHY circuitry 320 includes or is coupled to a controller 372 that is configured to control operation of the PHY circuitry 320 according to various operating states and/or modes and to control transitioning between the operating states and/or modes. For example, as will be described in more detail below, the controller 372 is configured to control the PHY circuitry 320 to ignore received signals and/or received data during a time period after the PHY circuitry 320 transitions to a low power mode with respect to receive functions, according to an embodiment. For instance, a signal received by the transceiver 344 from a link partner may include glitches/transients after a transition to a low power mode of operation, and the controller 372 controls the PHY circuitry 320 to ignore received signals during a time period after the transition to the low power mode of operation to avoid unpredictable behavior by the network interface device 300. In an embodiment, the controller 372 includes a timer 376 for measuring the time period.

As another example, as will be described in more detail below, the controller 372 is additionally or alternatively configured to, when the PHY circuitry 320 is to exit the low power mode, control the PHY circuitry 320 to transmit a wake signal without first transmitting an alert signal, according to an embodiment.

In an embodiment, the controller 372 comprises a hardware state machine in which at least some states of the hardware state machine generally correspond to at least some of the various operating states and/or modes of the PHY circuitry 320. The hardware state machine is configured to generate control signals that control operation of the PHY circuitry 320 according to various operating states and/or modes, and to transition between states of the hardware state machine in response to receiving signal and/or information.

In another embodiment, the controller 372 comprises a processor that executes machine readable instructions that causes the processor to implement a state machine similar to the hardware state machine described above.

Figure 4:
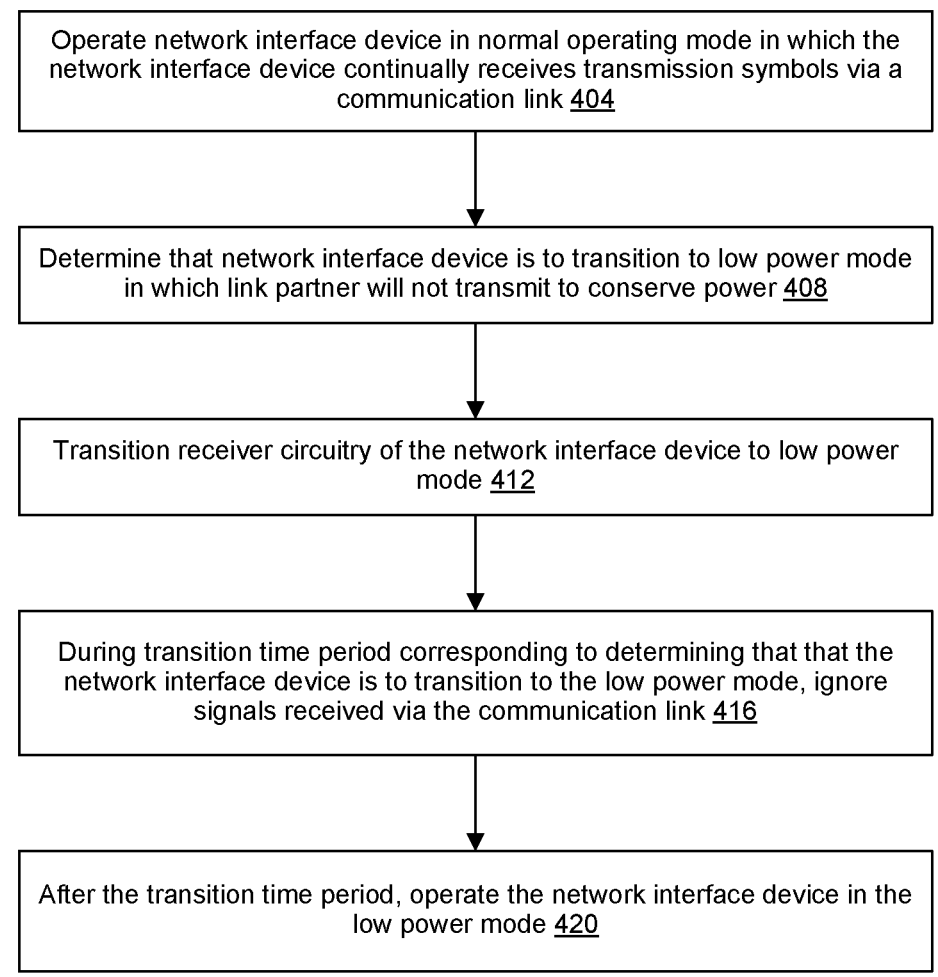
FIG. 4 is a flow diagram of an example method for maintaining a communication link, according to an embodiment.

FIG. 4 is a flow diagram of an example method 400 for maintaining a communication link, according to an embodiment. The method 400 is implemented by the network interface device 300 of FIG. 3, according to an embodiment, and the method 400 is described with reference to FIG. 3 for ease of explanation. In other embodiments, the method 300 is implemented by another suitable network interface device. Additionally, the network interface device 300 does not implement the method 400 and/or implements another suitable method for maintaining a communication link different than the method 400, in some embodiments.

At block 404, a network interface device operates in a normal operating state in which the network interface device continually receives transmission symbols via the communication link. For example, the controller 372 controls the PHY circuitry 320 to operate in the normal operating state in which the PHY circuitry 320 continually receives transmission symbols via the communication link.

At block 408, the network interface determines that the network interface device is to transition to a low power mode in which a link partner will not transmit to conserve power. In an embodiment, the low power mode corresponds to the low power mode described with reference to FIGS. 1A-B. In an embodiment, determining that the network interface device is to transition to the low power mode is in response to receiving a sleep signal from the link partner via the communication medium. For example, the controller 372 determines that the network interface device 100 is to transition to the low power mode.

At block 412, in response to determining that the network interface device is to transition to the low power mode at block 408, the network interface transitions at least receiver circuitry of the network interface to the low power mode. For example, the controller 372 controls the PHY circuitry 320 to transition to the low power mode. In an embodiment, transitioning at least receiver circuitry of the network interface to the low power mode at block 412 comprises transitioning at least receiver circuitry of the network interface to an off state to reduce power consumption as compared to operating the at least receiver circuitry in the normal operating mode.

At block 416, during a transition time period corresponding to determining that that the network interface device is to transition to the low power mode at block 408, the network interface device ignores signals received via the communication link. In an embodiment, a start of the time period corresponds to a start of the quiet period (such as described with reference to FIGS. 1A-B) of the low power mode. For example, the controller 372 controls the PHY circuitry 320 to ignore signals received via the communication link during the time period. In an embodiment, the controller 372 starts the timer 372 to coincide with a start of the quiet period (such as described with reference to FIGS. 1A-B) of the low power mode, and uses the timer 376 to control the PHY circuitry 320 to ignore signals received via the communication link during the time period.

In an embodiment, the transition time period is approximately 150 nanoseconds (ns) (i.e., 150 ns±15 ns). In another embodiment, the transition time period is approximately 330 ns (i.e., 330 ns±33 ns). In another embodiment, the transition time period approximately equals a time duration of an RS FEC frame.

At block 420, after the first transition time period, the network interface device operates in the low power mode. In an embodiment, operating the network interface device in the low power mode comprises maintaining receiver circuitry of the network interface in an off state while in the plurality of quiet time slots within a quiet period. For example, the controller 372 controls the PHY circuitry 320 to operate in the low power mode.

In an embodiment, the time transition period corresponding to block 416 is a first transition time period, and the method 400 further comprises: during respective second transition time periods prior to respective alert time slots between quiet time slots of a quiet period corresponding to the low power mode, the network interface device ignores signals received via the communication link; and in connection with each alert time slot, the network interface transitions at least receiver circuitry of the network interface device to an on state so that the receiver circuitry is in the on state during each alert time slot.

In an embodiment, the time transition period corresponding to block 416 is a first transition time period, and the method 400 further comprises: during a second transition time period prior to a refresh period in which the receiver circuitry is to be in an on state to receive a refresh signal via the communication link, the network interface device ignores signals received via the communication link; and in connection with the refresh period, the network interface transitions at least receiver circuitry of the network interface device to the on state so that the receiver circuitry is in the on state during the refresh period.

In an embodiment, the second transition time period is approximately 150 ns (i.e., 150 ns±15 ns). In another embodiment, the second transition time period is approximately 330 ns (i.e., 330 ns±33 ns). In another embodiment, the second transition time period approximately equals a time duration of an RS FEC frame.

Figure 5:
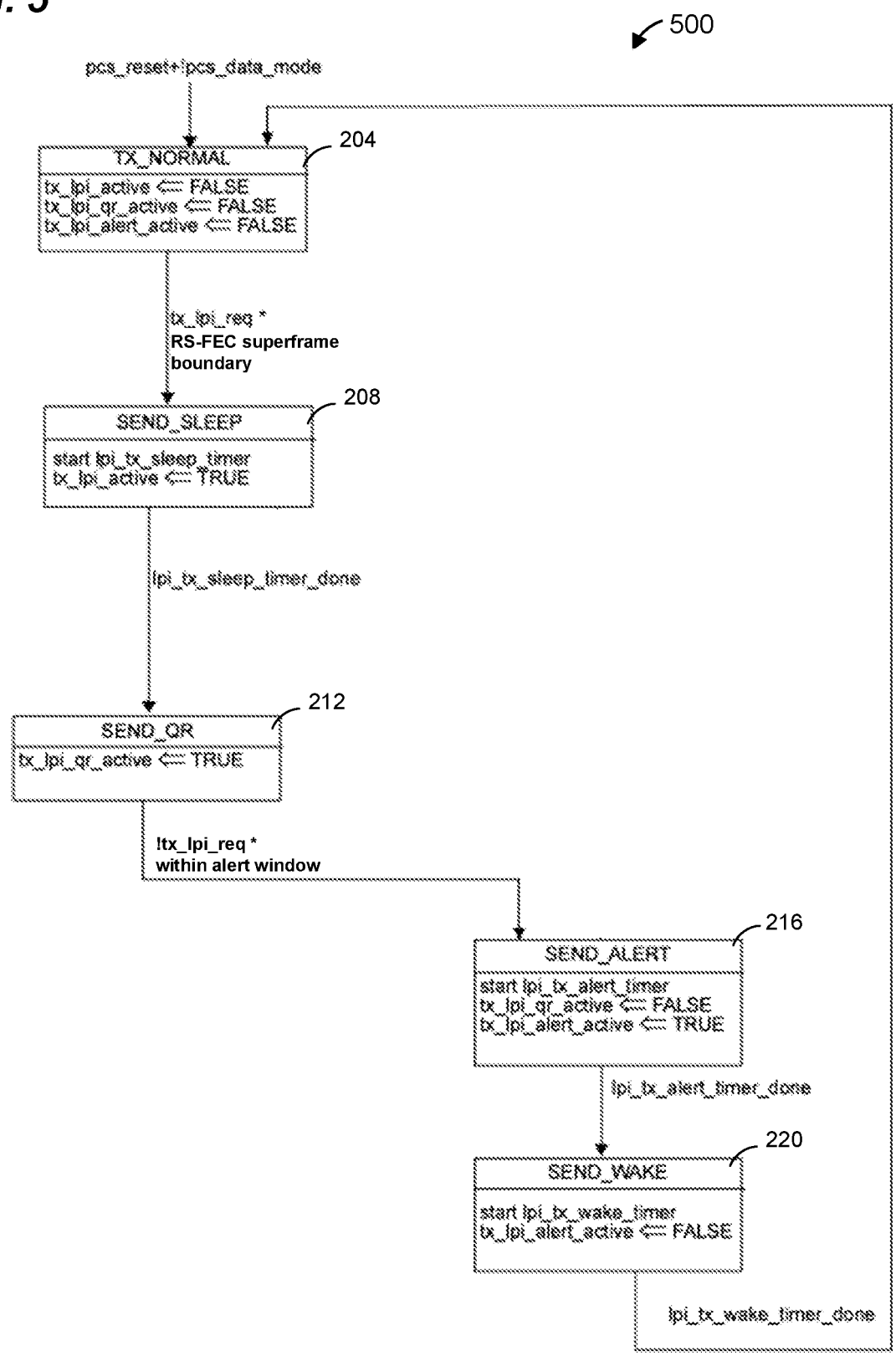
FIG. 5 is a state diagram illustrating example states and state transitions for transmit operations for a network interface device, according to an embodiment.

FIG. 5 is a state diagram 500 illustrating example states and state transitions for transmit operations for a network interface device, according to an embodiment. In an embodiment, the network interface 300 is configured to function according to the state diagram 500, and FIG. 5 is described with reference to FIG. 3 for ease of explanation. In other embodiments, the network device 300 is not configured to function according to the state diagram 500 or is configured to function according to another suitable state diagram. Additionally, in other embodiments, a suitable network interface device other than the network interface 300 is configured to function according to the state diagram 500.

In an embodiment, the state diagram 500 generally corresponds to a modification of the state diagram 200 of FIG. 2, and state diagram 500 of FIG. 5 is discussed with reference to FIG. 2 for ease of explanation. Like-numbered elements are briefly described with reference to FIG. 3, but otherwise are not described again in detail for purposes of brevity.

In the state 204, the controller 372 controls the PHY circuitry 320 to operate in the normal operating mode. In response to the controller 372 determining that transmit circuitry of the PHY circuitry 320 is to transition to the low power mode, the controller 372 transitions to the state 208. In the state 208, the controller 372 controls the PHY circuitry 320 to transmit the sleep signal.

After the PHY circuitry 320 transmits the sleep signal, the controller 372 transitions to the state 212. In state 212, which corresponds to the quiet/refresh cycle 100, 150 of FIGS. 1A-B, the controller 372 controls the PHY circuitry 320 to operate in a manner described above with reference to FIGS. 1A-B.

When the controller 372 determines that the network interface is to exit the low power mode, the controller 372 transitions from the state 212 to a state 216 at the end of an RS-FEC codeword frame boundary.

In the state 216, which corresponds to transmission of the alert signal, the controller 372 controls the PHY circuitry 320 to transmit the alert signal. When transmission of the alert signal is completed, the controller 372 transitions to the state 220, which corresponds to transmitting the wake signal.

In state 220, the controller 372 controls the PHY circuitry 320 to transmit the wake signal to the link partner to prompt the link partner to exit the LPI mode. When transmission of the wake signal is completed, the controller 372 transitions back to state 204.

Figure 2:
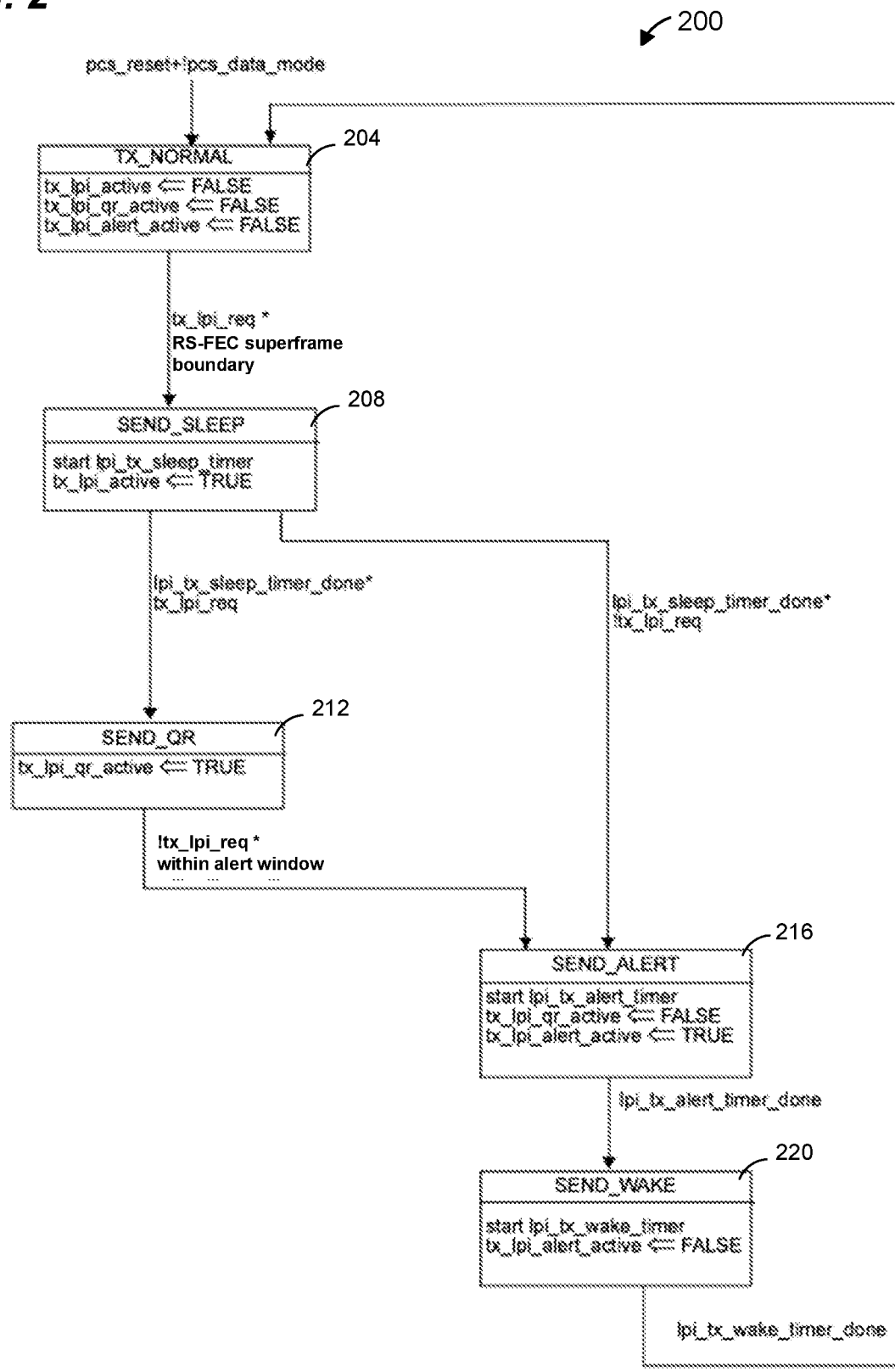
FIG. 2 is a state diagram that illustrates transmit-side operation of an Energy Efficient Ethernet (EEE) procedure defined by IEEE Std 802.3ch™-2020.

In the state diagram 500, there is no direct transition from the state 208 to the state 216, unlike the state diagram 200 of FIG. 2. Therefore, even if the network device 300 determines, during the state 208, that transmitter circuitry no longer should transition to the low power mode, the network device still transitions to the state 212 and remains in the low power mode until the next alert window. Then, the network device transitions the transmitter circuitry to the normal operating mode to transmit the alert signal at state 216.

Because there is no direct transition from the state 208 to the state 216, the state diagram 500 is less complicated than the state diagram 200 of FIG. 2, which leads to less interoperability issues as compared to communication devices that operate according to the state diagram 200 of FIG. 2. On the other hand, there will be an increase in latency in situations in which the network device 300 determines, during the state 208, that transmitter circuitry no longer should transition to the low power mode.

Figure 6:
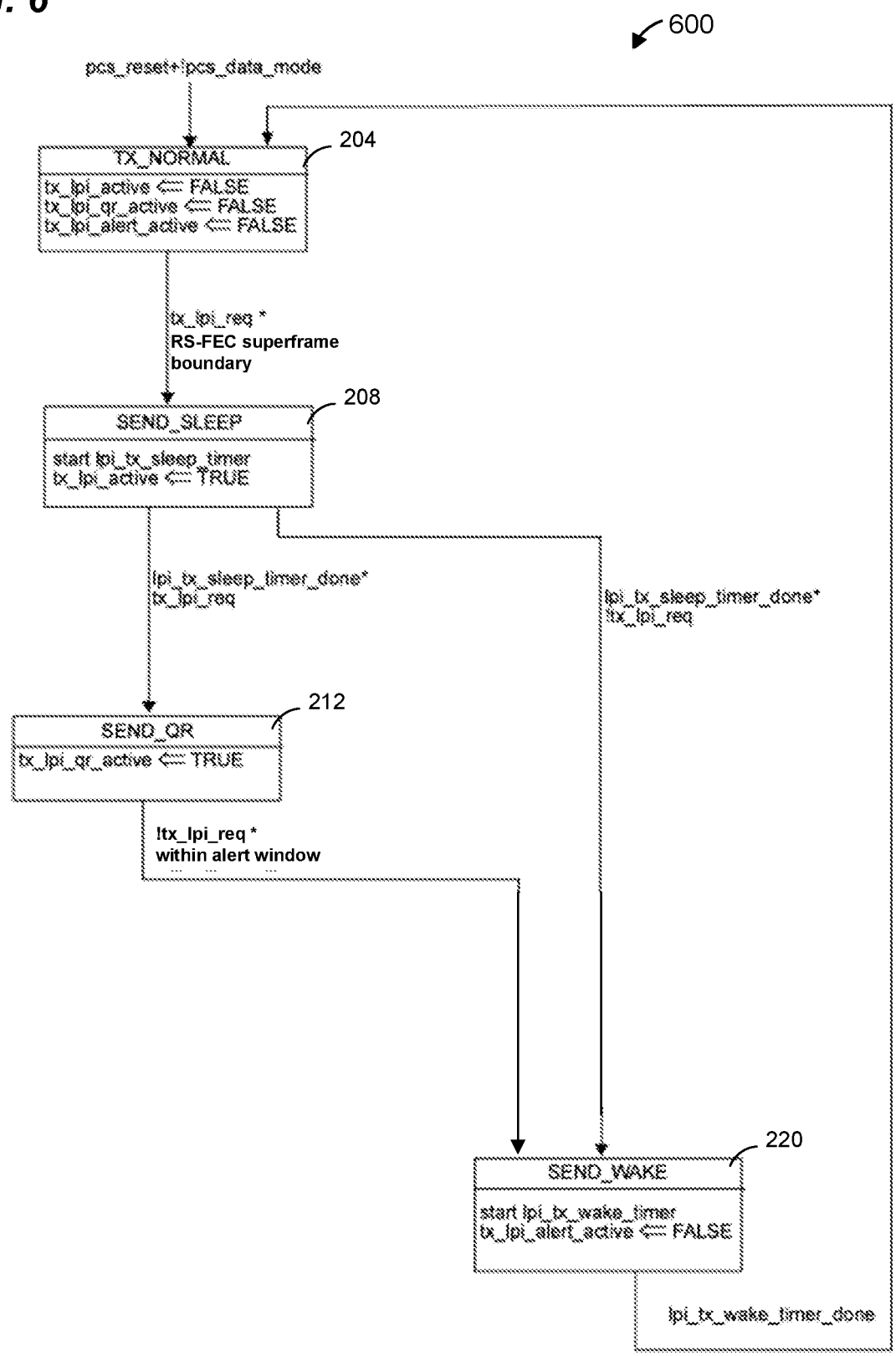
FIG. 6 is another state diagram illustrating example states and state transitions for transmit operations for a network interface device, according to another embodiment.

FIG. 6 is a state diagram 600 illustrating example states and state transitions for transmit operations for a network interface device, according to another embodiment. In an embodiment, the network interface 300 is configured to function according to the state diagram 600, and FIG. 6 is described with reference to FIG. 3 for ease of explanation. In other embodiments, the network device 300 is not configured to function according to the state diagram 600 or is configured to function according to another suitable state diagram. Additionally, in other embodiments, a suitable network interface device other than the network interface 300 is configured to function according to the state diagram 600.

In an embodiment, the state diagram 600 generally corresponds to a modification of the state diagram 200 of FIG. 2, and state diagram 600 of FIG. 6 is discussed with reference to FIG. 2 for ease of explanation. Additionally, the state diagram is similar to the state diagram 500 of FIG. 5. Like-numbered elements are not described again in detail for purposes of brevity.

In the state diagram 600, the state 216 is omitted, and the states 208, 212 transition directly to the state 220, as compared to the state diagram 200 of FIG. 2. As a result, the network device does not transmit an alert signal prior to transmitting the wake signal at state 220. More particularly, when the controller 372 is in the state 212, which corresponds to the quiet/refresh cycle 100, 150 of FIGS. 1A-B, the controller 372 controls the PHY circuitry 320 to operate in a manner described above with reference to FIGS. 1A-B. When the controller 372 determines that the network interface is to exit the low power mode, the controller 372 transitions from the state 212 to the state 220 at the end of an RS-FEC superframe boundary. During the state 220, the controller 372 controls the PHY circuitry 320 to transmit the wake signal. In an embodiment, the controller 372 controls the PHY circuitry 320 to begin transmitting the wake signal during an alert window without transmitting an alert signal prior to the wake signal in the alert window. In an embodiment, the controller 372 controls the PHY circuitry 320 to start transmitting the wake signal at a beginning of the alert window. In an embodiment, the beginning of the alert window coincides with an RS-FEC superframe boundary.

Similarly, if the controller 372 determines in the state 208 that the transmitter circuitry no longer should transition to the low power mode, the controller 372 transitions to the state 220 after transmission of the sleep signal is complete.

Because transmission of the alert signal at state 216 prior to transmitting the wake signal at state 220 is eliminated, the state diagram 600 is less complicated than the state diagram 200 of FIG. 2, which leads to less interoperability issues as compared to communication devices that operate according to the state diagram 200 of FIG. 2. Additionally, because transmission of the alert signal prior to the wake signal is eliminated, there is more time available for transmitting the wake signal. Thus, the wake signal is lengthened as compared to the wake signal specified in the current IEEE 802.3 Standard in order to make the wake signal easier to detect for the link partner, according to an embodiment. In other embodiments, the wake signal is modified, additionally or alternatively, in one or more other suitable ways to make the wake signal easier to detect for the link partner.

Figure 7:
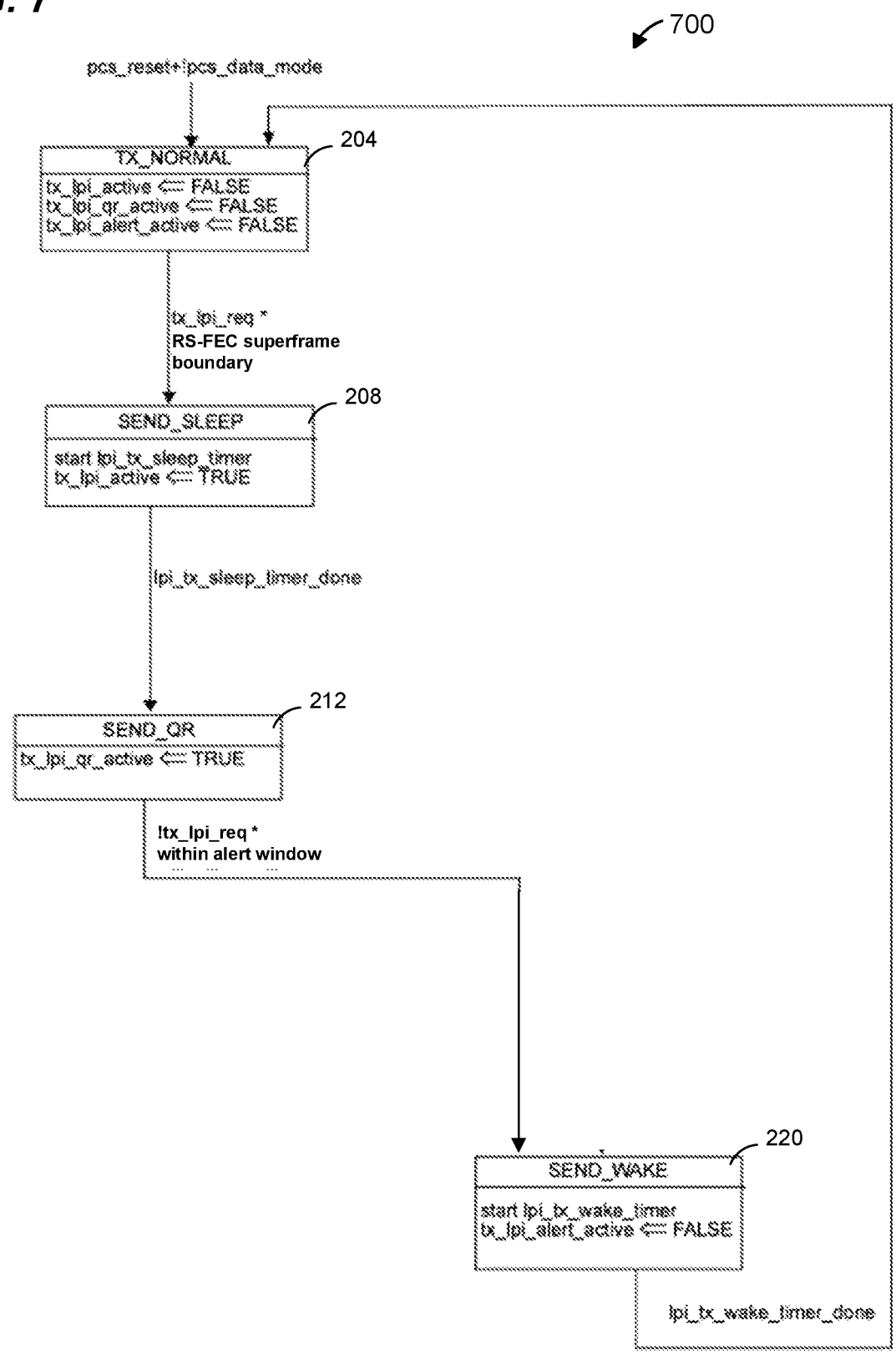
FIG. 7 is another state diagram illustrating example states and state transitions for transmit operations for a network interface device, according to yet another embodiment.

FIG. 7 is a state diagram 700 illustrating example states and state transitions for transmit operations for a network interface device, according to another embodiment. In an embodiment, the network interface 300 is configured to function according to the state diagram 700. In other embodiments, the network device 300 is not configured to function according to the state diagram 700 or is configured to function according to another suitable state diagram. Additionally, in other embodiments, a suitable network interface device other than the network interface 300 is configured to function according to the state diagram 700.

The state diagram 700 generally corresponds to a combination of the state diagram 500 of FIG. 5 and the state diagram 600 of FIG. 6. In particular, the state 216 of FIG. 2 is omitted like the state diagram 600, and there is no transition from the state 208 to the state 220 like the state diagram 500.

Figure 8:
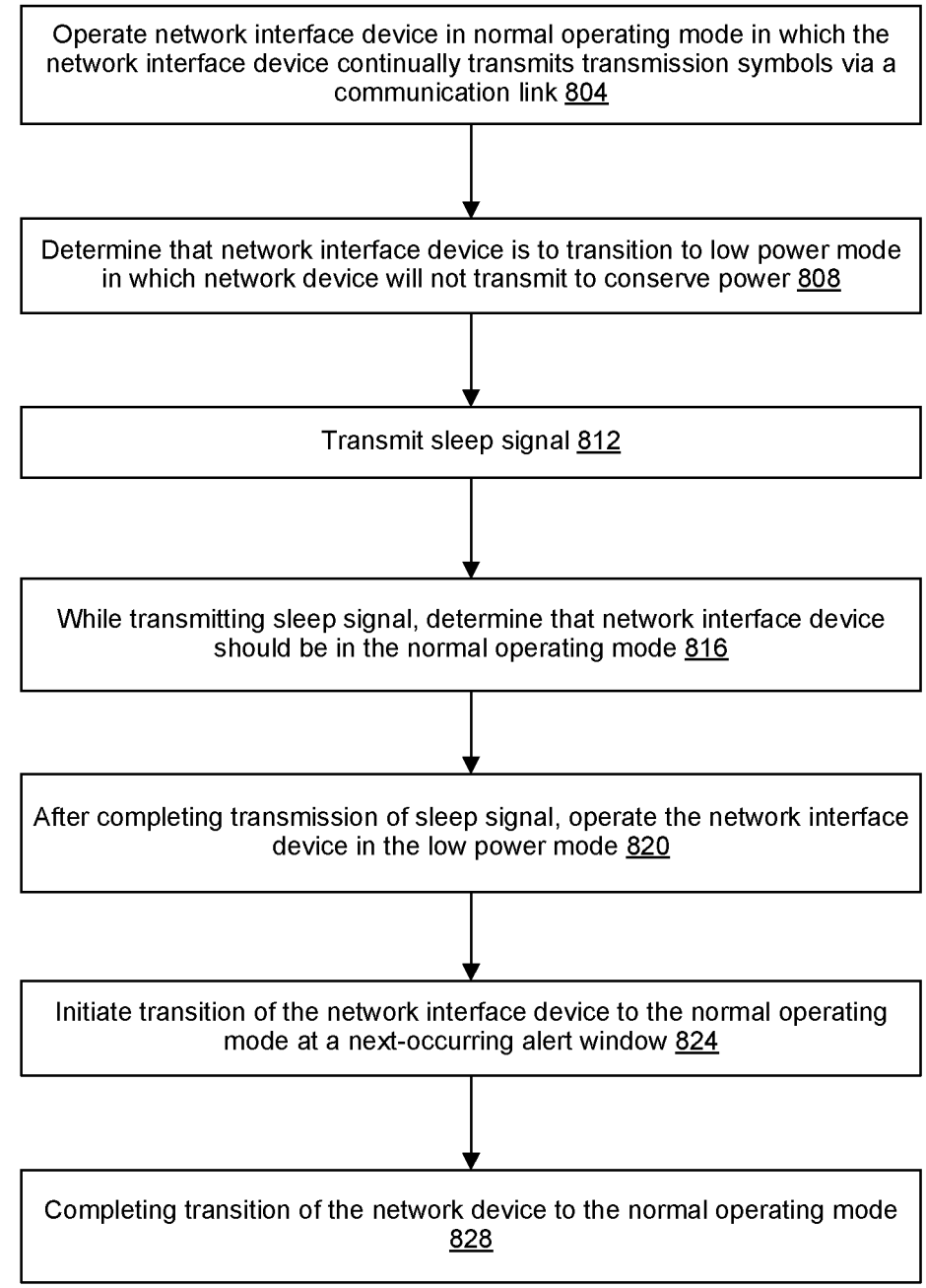
FIG. 8 is a flow diagram of another example method for maintaining a communication link, according to another embodiment.

FIG. 8 is a flow diagram of another example method 800 for maintaining a communication link, according to an embodiment. The method 800 is implemented by the network interface device 300 of FIG. 3, according to an embodiment, and the method 800 is described with reference to FIG. 3 for ease of explanation. In other embodiments, the method 800 is implemented by another suitable network interface device. Additionally, the network interface device 300 does not implement the method 800 and/or implements another suitable method for maintaining a communication link different than the method 800, in some embodiments.

At block 804, a network interface device operates in a normal operating state in which the network interface device continually transmits transmission symbols via the communication link. For example, the controller 372 controls the PHY circuitry 320 to operate in the normal operating state in which the PHY circuitry 320 continually transmits transmission symbols via the communication link.

At block 808, the network interface determines that the network interface device is to transition to a low power mode in which the network interface will not transmit to conserve power. In an embodiment, the low power mode corresponds to the low power mode described with reference to FIGS. 1A-B. For example, the controller 372 determines that the PHY circuitry 320 is to transition to the low power mode.

At block 812, in response to determining that the network interface device is to transition to the low power mode at block 808, the network interface transmits a sleep signal to a link partner via the communication link to prompt the link partner to transition to the low power mode. For example, the controller 372 controls the PHY circuitry 320 to transmit the sleep signal. Additionally, the network interface transmits the sleep signal while in the state 208.

At block 816, while transmitting the sleep signal, the network interface device determines that the network interface device is to be in the normal operating mode. For example, the controller 372 determines that the PHY circuitry 320 is to be in the normal operating mode in response to determining, while the PHY circuitry 320 is transmitting the sleep signal, that there is data (e.g., at the MAC processor 310) that is to be transmitted via the communication link. For instance, while transmitting the sleep signal in the state 208, the network interface determines that the network interface device is to be in the normal operating mode.

At block 820, after completing transmission of the sleep signal and after determining at block 816 that the network interface device is to be in the normal operating mode, operating the network device in the low power mode. For example, the controller 372 controls the PHY circuitry 320 to operate in the low power mode. For instance, the network interface transitions from the state 208 to the state 212 even when the network interface determined during the state 208 that the network interface device is to be in the normal operating mode.

At block 824, in response to determining at block 816 that the network interface device is to be in the normal operating mode, the network interface initiates a transition of network interface back to the normal operating mode at a next-occurring alert window. For example, the controller 372 initiates transition of the PHY circuitry 320 back to the normal operating mode at a next-occurring alert window. For instance, the network interface transitions from the state 212 to the state 216 (FIG. 5) at which the network device transmits an alert signal. As another example, the network interface transitions from the state 212 to the state 220 (FIG. 7) at which the network device transmits a wake signal.

At block 828, in response to determining, while transmitting the sleep signal, that the network interface device should be in the normal operating mode, the network device completes the transition of the network device to the normal operating mode. For example, the controller 372 controls the transition of the PHY circuitry 320 back to the normal operating mode. For instance, after the network interface transmits the alert signal at state 216 (FIG. 5), the network interface transitions to the state 220 to transmit the wake signal, and further transitions to the state 204. As another example, after the network interface transmits the wake signal at state 220 (FIG. 7), the network device transitions to the state 204.

Embodiment 1: A network interface device, comprising: physical layer (PHY) circuitry comprising a transceiver, the PHY processor being configured to perform PHY functions associated with a communication link; and a controller. The controller is configured to: operate the PHY circuitry in a normal operating mode in which the PHY circuitry continually receives transmission symbols via the communication link; determine that the PHY circuitry is to transition to a low power mode in which a link partner does not transmit during a quiet period to conserve power; in response to determining that the PHY circuitry is to transition to the low power mode, transition receiver circuitry of the PHY circuitry to the low power mode; during a first transition time period corresponding to determining that that the network interface device is to transition to the low power mode, control the PHY circuitry to ignore signals received via the communication link; and after the first transition time period, control the PHY circuitry to operate the receiver circuitry in the low power mode.

Embodiment 2: The network interface device of embodiment 1, wherein the controller is configured to: control the PHY circuitry to ignore signals received via the communication link during a 150 nanosecond (ns)±15 ns time period corresponding to determining that that the network interface device is to transition to the low power state.

Embodiment 3: The network interface device of either of embodiments 1 or 2, wherein the controller is further configured to: during respective second transition time periods prior to respective alert time slots between quiet time slots of the quiet period, control the PHY circuitry to ignore signals received via the communication link; and in connection with each alert time slot, transition receiver circuitry of the network interface device to an on state so that the receiver circuitry is in the on state during each alert time slot.

Embodiment 4: The network interface device of any of embodiments 1-3, wherein the controller is further configured to: during a second transition time period prior to a refresh period in which the receiver circuitry is to be in an on state to receive a refresh signal via the communication link, control the PHY circuitry to ignore signals received via the communication link; and in connection with the refresh period, transition receiver circuitry of the network interface device to the on state so that the receiver circuitry is in the on state during the refresh period.

Embodiment 5: The network interface device of embodiment 4, wherein the controller is configured to: control the PHY circuitry to ignore signals received via the communication link during a 150 nanosecond (ns)±15 ns time period in connection with the refresh period.

Embodiment 6: A method for maintaining a communication link, the method comprising: operating a network interface device in a normal operating mode in which the network interface device continually receives transmission symbols via the communication link; determining, at the network interface device, that the network interface device is to transition to a low power mode in which a link partner does not transmit during a quiet period to conserve power; in response to determining that the network interface device is to transition to the low power mode, transitioning receiver circuitry of the network interface device to the low power mode; during a first transition time period corresponding to determining that that the network interface device is to transition to the low power mode, ignoring, at the network interface device, signals received via the communication link; and after the first transition time period, operating the receiver circuitry in the low power mode.

Embodiment 7: The method for maintaining the communication link of embodiment 6, wherein ignoring signals received via the communication link during the first transition time period comprises: ignoring signals received via the communication link during a 150 nanosecond (ns)±15 ns time period corresponding to determining that that the network interface device is to transition to the low power state.

Embodiment 8: The method for maintaining the communication link of either of embodiments 6 or 7, further comprising: during respective second transition time periods prior to respective alert time slots between quiet time slots of the quiet period, ignoring, at the network interface device, signals received via the communication link; and in connection with each alert time slot, transitioning receiver circuitry of the network interface device to an on state so that the receiver circuitry is in the on state during each alert time slot.

Embodiment 9: The method for maintaining the communication link of any of embodiments 6-8, further comprising: during a second transition time period prior to a refresh period in which the receiver circuitry is to be in an on state to receive a refresh signal via the communication link, ignoring, at the network interface device, signals received via the communication link; and in connection with the refresh period, transitioning receiver circuitry of the network interface device to the on state so that the receiver circuitry is in the on state during the refresh period.

Embodiment 10: The method for maintaining the communication link of embodiment 9, wherein ignoring signals received via the communication link during the second transition time period comprises: ignoring signals received via the communication link during a 150 nanosecond (ns) ±15 ns time period in connection with the refresh period.

Embodiment 11: A network interface device, comprising: physical layer (PHY) circuitry comprising a transceiver, the PHY processor being configured to perform PHY functions associated with a communication link; and a controller. The controller is configured to: control the PHY circuitry to operate in a normal operating mode in which the PHY circuitry continually transmits transmission symbols via the communication link; determine that the PHY circuitry is to transition to a low power mode in which the PHY circuitry stops transmissions during a quiet period to conserve power; in response to determining that the PHY circuitry is to transition to the low power mode, control the PHY circuitry to transmit a sleep signal to a link partner to prompt the link partner to transition to the low power mode; while transmitting the sleep signal, determine that the PHY circuitry should be in the normal operating mode; after completing transmission of the sleep signal and after determining that the PHY circuitry should be in the normal operating mode, operating the PHY circuitry in the low power mode; in response to determining, while transmitting the sleep signal, that the PHY circuitry should be in the normal operating mode, initiate transition of the PHY circuitry to the normal operating mode at a next-occurring alert window; and in response to determining, while transmitting the sleep signal, that the PHY circuitry should be in the normal operating mode, complete transitioning of the PHY circuitry to the normal operating mode.

Embodiment 12: The network interface device of embodiment 11, wherein initiating transition of the network interface device to the normal operating mode at the next-occurring alert window comprises: transmitting, by the network interface device, an alert signal to the link partner via the communication link.

Embodiment 13: The network interface device of embodiment 12, wherein completing transitioning of the network device to the normal operating mode comprises: transmitting, by the network interface device, a wake signal to the link partner via the communication link after transmitting the alert signal.

Embodiment 14: The network interface device of embodiment 11, wherein initiating transition of the network interface device to the normal operating mode at the next-occurring alert window comprises: transmitting, by the network interface device, a wake signal to the link partner via the communication link.

Embodiment 15: The network interface device of embodiment 14, wherein initiating transition of the network interface device to the normal operating mode at the next-occurring alert window comprises: transmitting, by the network interface device, the wake signal to the link partner via the communication link without first transmitting an alert signal.

Embodiment 16: A method for maintaining a communication link, the method comprising: operating a network interface device in a normal operating mode in which the network interface device continually transmits transmission symbols via the communication link; determining, at the network interface device, that the network interface device is to transition to a low power mode in which the network interface device stops transmissions during a quiet period to conserve power; in response to determining that the network interface device is to transition to the low power mode, transmitting, by the network interface device, a sleep signal to a link partner to prompt the link partner to transition to the low power mode; while transmitting the sleep signal, determining at the network interface device, that the network interface device should be in the normal operating mode; after completing transmission of the sleep signal and after determining that the network interface device should be in the normal operating mode, operating the network interface device in the low power mode; in response to determining, while transmitting the sleep signal, that the network interface device should be in the normal operating mode, initiating transition of the network interface device to the normal operating mode at a next-occurring alert window; and in response to determining, while transmitting the sleep signal, that the network interface device should be in the normal operating mode, completing transitioning of the network device to the normal operating mode.

Embodiment 17: The method of maintaining the communication link of embodiment 16, wherein initiating transition of the network interface device to the normal operating mode at the next-occurring alert window comprises: transmitting, by the network interface device, an alert signal to the link partner via the communication link.

Embodiment 18: The method of maintaining the communication link of embodiment 17, wherein completing transitioning of the network device to the normal operating mode comprises: transmitting, by the network interface device, a wake signal to the link partner via the communication link after transmitting the alert signal.

Embodiment 19: The method of maintaining the communication link of embodiment 16, wherein initiating transition of the network interface device to the normal operating mode at the next-occurring alert window comprises: transmitting, by the network interface device, a wake signal to the link partner via the communication link.

Embodiment 20: The method of maintaining the communication link of embodiment 19, wherein initiating transition of the network interface device to the normal operating mode at the next-occurring alert window comprises: transmitting, by the network interface device, the wake signal to the link partner via the communication link without first transmitting an alert signal.

Embodiment 21: A network interface device, comprising: physical layer (PHY) circuitry comprising a transceiver, the PHY circuitry being configured to perform PHY functions associated with a communication link; and a controller. The controller is configured to: operate the PHY circuitry in a normal operating mode in which the PHY circuitry continually transmits transmission symbols via the communication link; determine that the PHY circuitry is to transition to a low power mode in which the PHY circuitry stops transmissions during a quiet period to conserve power; in response to determining that the PHY circuitry is to transition to the low power mode, control the PHY circuitry to transmit a sleep signal to a link partner to prompt the link partner to transition to the low power mode; after completing transmission of the sleep signal, control the PHY circuitry to operate in the low power mode; determine that the PHY circuitry is to transition to the normal operating mode; in response to determining that the PHY circuitry is to transition to the normal operating mode, control the PHY circuitry to transmit a wake signal to the link partner via the communication link, including controlling the PHY circuitry to begin transmission of the wake signal during an alert window without transmitting an alert signal prior to the wake signal in the alert window; and after transmitting the wake signal, control the PHY circuitry to operate in the normal operating mode.

Embodiment 22: The network interface device of embodiment 21, wherein the controller is configured to control the PHY circuitry to start transmission of the wake signal at a beginning of the alert window.

Embodiment 23: The network interface device of embodiment 22, wherein the beginning of the alert window coincides with a Reed-Solomon forward error correction (RS-FEC) superframe boundary.

Embodiment 24: A method for maintaining a communication link, the method comprising: operating a network interface device in a normal operating mode in which the network interface device continually transmits transmission symbols via the communication link; determining, at the network interface device, that the network interface device is to transition to a low power mode in which the network interface device stops transmissions during a quiet period to conserve power; in response to determining that the network interface device is to transition to the low power mode, transmitting, by the network interface device, a sleep signal to a link partner to prompt the link partner to transition to the low power mode; after completing transmission of the sleep signal, operating the network interface device in the low power mode; determining, at the network interface device, that the network interface device is to transition to the normal operating mode; in response to determining that the network interface device is to transition to the normal operating mode, transmitting a wake signal to the link partner via the communication link, including beginning transmission of the wake signal during an alert window without transmitting an alert signal prior to the wake signal in the alert window; and after transmitting the wake signal, operating the network interface device in the normal operating mode.

Embodiment 25: The method of maintaining the communication link of embodiment 24, wherein transmitting the wake signal comprises: starting transmission of the wake signal at a beginning of the alert window.

Embodiment 26: The method of maintaining the communication link of embodiment 25, wherein the beginning of the alert window coincides with a Reed-Solomon forward error correction (RS-FEC) superframe boundary.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory coupled to the processor, such as a RAM, a ROM, a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network interface device, comprising:
   physical layer (PHY) circuitry comprising a transceiver, the PHY processor being configured to perform PHY functions associated with a communication link; and
   a controller configured to:
      operate the PHY circuitry in a normal operating mode in which the PHY circuitry continually receives transmission symbols from a link partner via the communication link,
      determine that the PHY circuitry is to transition to a low power mode in which the link partner does not transmit via the communication link during a quiet period to conserve power,
      in response to determining that the PHY circuitry is to transition to the low power mode, transition receiver circuitry of the PHY circuitry to the low power mode,
      measure a first transition time period that begins upon determining that the network interface device is to transition to the low power mode,
      during the first transition time period control the PHY circuitry to ignore signals received from the link partner via the communication link, and
      after the first transition time period, control the PHY circuitry to operate the receiver circuitry in the low power mode.

2. The network interface device of claim 1, wherein the controller is configured to:
   determine the first transition time period to be a 150 nanosecond (ns)±15 ns time period.

3. The network interface device of claim 1, wherein the controller is further configured to:
   during respective second transition time periods prior to respective alert time slots between quiet time slots of the quiet period, control the PHY circuitry to ignore signals received via the communication link; and
   in connection with each alert time slot, transition receiver circuitry of the network interface device to an on state so that the receiver circuitry is in the on state during each alert time slot.

4. The network interface device of claim 1, wherein the controller is further configured to:
   during a second transition time period prior to a refresh period in which the receiver circuitry is to be in an on state to receive a refresh signal via the communication link, control the PHY circuitry to ignore signals received via the communication link; and
   in connection with the refresh period, transition receiver circuitry of the network interface device to the on state so that the receiver circuitry is in the on state during the refresh period.

5. The network interface device of claim 4, wherein the controller is configured to:
   control the PHY circuitry to ignore signals received via the communication link during a 150 nanosecond (ns) ±15 ns time period in connection with the refresh period.

6. A method for maintaining a communication link, the method comprising:
   operating a network interface device in a normal operating mode in which the network interface device continually receives transmission symbols from a link partner via the communication link;

determining, at the network interface device, that the network interface device is to transition to a low power mode in which the link partner does not transmit via the communication link during a quiet period to conserve power;

in response to determining that the network interface device is to transition to the low power mode, transitioning receiver circuitry of the network interface device to the low power mode;

measuring, at the network interface device, a first transition time period that begins upon the network interface device determining that the network interface device is to transition to the low power mode;

during the first transition time period, ignoring, at the network interface device, signals received via the communication link; and in response to determining that the PHY circuitry is to transition to the low power mode, operating the receiver circuitry in the low power mode.

7. The method for maintaining the communication link of claim 6, wherein the first transition time period comprises: measuring a 150 nanosecond (ns)±15 ns time period.

8. The method for maintaining the communication link of claim 6, further comprising:

during respective second transition time periods prior to respective alert time slots between quiet time slots of the quiet period, ignoring, at the network interface device, signals received via the communication link; and in connection with each alert time slot, transitioning receiver circuitry of the network interface device to an on state so that the receiver circuitry is in the on state during each alert time slot.

9. The method for maintaining the communication link of claim 6, further comprising:

during a second transition time period prior to a refresh period in which the receiver circuitry is to be in an on state to receive a refresh signal via the communication link, ignoring, at the network interface device, signals received via the communication link; and in connection with the refresh period, transitioning receiver circuitry of the network interface device to the on state so that the receiver circuitry is in the on state during the refresh period.

10. The method for maintaining the communication link of claim 9, wherein ignoring signals received via the communication link during the second transition time period comprises:

ignoring signals received via the communication link during a 150 nanosecond (ns)±15 ns time period in connection with the refresh period.

11. A network interface device, comprising:

physical layer (PHY) circuitry comprising a transceiver, the PHY processor being configured to perform PHY functions associated with a communication link; and a controller configured to:

control the PHY circuitry to operate in a normal operating mode in which the PHY circuitry continually transmits transmission symbols via the communication link, determine that the PHY circuitry is to transition to a low power mode in which the PHY circuitry stops transmissions during a quiet period to conserve power, in response to determining that the PHY circuitry is to transition to the low power mode, control the PHY circuitry to transmit a sleep signal to a link partner to prompt the link partner to transition to the low power mode, while transmitting the sleep signal, determine that the PHY circuitry should be in the normal operating mode, after completing transmission of the sleep signal and after determining that the PHY circuitry should be in the normal operating mode, operating the PHY circuitry in the low power mode, in response to determining, while transmitting the sleep signal, that the PHY circuitry should be in the normal operating mode, initiate transition of the PHY circuitry to the normal operating mode at a next-occurring alert window, and in response to determining, while transmitting the sleep signal, that the PHY circuitry should be in the normal operating mode, complete transitioning of the PHY circuitry to the normal operating mode.

12. The network interface device of claim 11, wherein initiating transition of the network interface device to the normal operating mode at the next-occurring alert window comprises:

transmitting, by the network interface device, an alert signal to the link partner via the communication link.

13. The network interface device of claim 12, wherein completing transitioning of the network device to the normal operating mode comprises:

transmitting, by the network interface device, a wake signal to the link partner via the communication link after transmitting the alert signal.

14. The network interface device of claim 11, wherein initiating transition of the network interface device to the normal operating mode at the next-occurring alert window comprises:

transmitting, by the network interface device, a wake signal to the link partner via the communication link.

15. The network interface device of claim 14, wherein initiating transition of the network interface device to the normal operating mode at the next-occurring alert window comprises:

transmitting, by the network interface device, the wake signal to the link partner via the communication link without first transmitting an alert signal.

16. A method for maintaining a communication link, the method comprising:

operating a network interface device in a normal operating mode in which the network interface device continually transmits transmission symbols via the communication link;

determining, at the network interface device, that the network interface device is to transition to a low power mode in which the network interface device stops transmissions during a quiet period to conserve power;

in response to determining that the network interface device is to transition to the low power mode, transmitting, by the network interface device, a sleep signal to a link partner to prompt the link partner to transition to the low power mode;

while transmitting the sleep signal, determining at the network interface device, that the network interface device should be in the normal operating mode;

after completing transmission of the sleep signal and after determining that the network interface device should be in the normal operating mode, operating the network interface device in the low power mode;

in response to determining, while transmitting the sleep signal, that the network interface device should be in the normal operating mode, initiating transition of the network interface device to the normal operating mode at a next-occurring alert window; and in response to determining, while transmitting the sleep signal, that the network interface device should be in the normal operating mode, completing transitioning of the network device to the normal operating mode.

17. The method of maintaining the communication link of claim 16, wherein initiating transition of the network interface device to the normal operating mode at the next-occurring alert window comprises:

transmitting, by the network interface device, an alert signal to the link partner via the communication link.

18. The method of maintaining the communication link of claim 17, wherein completing transitioning of the network device to the normal operating mode comprises:

transmitting, by the network interface device, a wake signal to the link partner via the communication link after transmitting the alert signal.

19. The method of maintaining the communication link of claim 16, wherein initiating transition of the network interface device to the normal operating mode at the next-occurring alert window comprises:

transmitting, by the network interface device, a wake signal to the link partner via the communication link.

20. The method of maintaining the communication link of claim 19, wherein initiating transition of the network interface device to the normal operating mode at the next-occurring alert window comprises:

transmitting, by the network interface device, the wake signal to the link partner via the communication link without first transmitting an alert signal.

* * * * *